United States Patent Office 2,907,785
Patented Oct. 6, 1959

2,907,785

ORGANIC COMPOUNDS OF SILICON AND PHOSPHORUS AND THEIR PREPARATION

George W. Parshall, Newark, Del., assignor to E. I. du Pont de Nemours and Company, Wilmington, Del., a corporation of Delaware No Drawing. Application October 7, 1957
Serial No. 688,781

8 Claims. (Cl. 260—448.2)

This invention relates to a new class of organo-metalloidal compounds containing both silicon and phosphorus. More particularly, it relates to the perhydrocarbylsilaphosphines and has as its primary objects provision of these compounds and of methods for their preparation.

Some compounds containing phosphorus with silicon bonded thereto are known. These range from the inorganic silylphosphines and the halosilylphosphines where phosphorus is solely trivalent to the organic alkyl- and alkoxysilylphosphonate esters where phosphorus is solely pentavalent.

In the silylphosphines one, two, or all three of the phosphine hydrogens are replaced by silyl- or halosubstituents. These compounds as a class range from liquid to gaseous, are difficult to prepare and handle, and are spontaneously inflammable. Furthermore, they have no proven utility. See for instance Aylett et al., Research 6, 30S (1953) and Fritz, Z. anorg. Chem. 280, 332 (1955).

In the silylphosphonates phosphorus is pentavalent and always is bonded to three oxygens. These compounds are relatively stable and unreactive, but again of no proven utility. See for instance Malatesta, Gazz. chim. Ital. 80, 527 (1950).

No hydrocarbylsilylphosphine has been reported. Indeed, speculation has apparently suggested only one such compound as possibly capable of synthesis. Sujishi et al. in ASTIA Report 27, 159 speculate that the reaction of dimethylphosphine with silyl bromide might give some silyldimethylphosphine, i.e., $(CH_3)_2PSiH_3$.

Somewhat analogous compounds of the next preceding member of group V–A, i.e., nitrogen, where nitrogen is trivalent and where silicon is bonded directly thereto are known, but these, like the trivalent phosphorus compounds, appear to be generically unstable. Thus, Pflugmacher et al., Angew. Chemie 69, 97 (1957), report the preparation of the tris(trichlorosilyl)amines and characterize them as thermally unstable.

Finally, it has been reported that the perhydrocarbyl derivatives of the silicon compounds with the next higher member of group V–A, i.e., nitrogen, cannot be made. More specifically, Burkhard et al., Chem. Rev. 41, 129 (1947) [original reference, R. O. Sauer et al., J. Am. Chem. Soc. 68, 241 (1946)] report that all attempts thus far have failed at the synthesis of a tris(trialkylsilyl)-amine.

From the foregoing, it would appear that the intermetalloidal compounds of elements of group V–A with silicon are not stable when the element of V–A is trivalent, especially when silicon is otherwise perhydrocarbyl-substituted.

It has now been surprisingly discovered that the perhydrocarbylsilaphosphines, in which every phosphorus is trivalent and is bonded solely to silicon and in which every silicon is in turn otherwise bonded solely to hydrocarbyl groups, not only can be produced, but are relatively stable compounds of proven utility. Furthermore, these compounds can be readily prepared by the direct metathesis of a perhydrocarbylhalosilane carrying at least one halogen directly and singly bonded to silicon, wherein the silicon is otherwise bonded by direct and single linkage only to halogen or hydrocarbyl radicals, with an alkali metal or alkaline earth metal phosphide, wherein phosphorus is trivalent and any valence thereof not satisfied by direct linkage to said metal is satisfied by direct and single linkage to perhydrocarbylsilyl radicals.

In its composition of matter aspects, the present invention is generic to perhydrocarbylsilaphosphines in which phosphorus is trivalent and is bonded by single bonds solely and separately to silicon which in turn is bonded otherwise solely, separately, and singly to hydrocarbyl groups. Thus, the products of this invention each contain at least one phosphorus atom and at least three silicon atoms, and otherwise consist solely of hydrocarbyl groups, i.e., the products contain only carbon, hydrogen, silicon, and phosphorus, with hydrogen being bonded solely, separately, and singly only to carbon. Generally each of the hydrocarbyl groups will contain not more than 12 carbons, preferably not more than 8, although larger numbers of carbons, i.e., 16–20 or more may be present.

The products having the aforesaid composition can be acyclic or cyclic in structure. In the first or acyclic category, the products will each contain one phosphorus atom bonded separately and singly to three different silicon atoms, each of which in turn is bonded separately to three hydrocarbyl groups, alike or different. A generic formula for the acyclic products can be written as

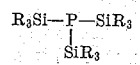

I. Tris(trihydrocarbylsilyl)phosphine where the R's represent hydrocarbyl radicals which can be alike or different and can contain up to 20 or more carbon atoms each. These radicals can be alkyl, aryl, cycloalkyl, alkaryl or aralkyl.

The second category, the cyclic products, includes compounds wherein each of two phosphorus atoms is bonded separately with single bonds to two silicon atoms to form a four-membered ring with the two silicon atoms each being otherwise bonded separately and singly only to two hydrocarbyl radicals, alike or different, the two phosphorus atoms being otherwise each bonded separately and singly only to a perhydrocarbylsilyl radical. The cyclic products also include bicyclic members having the just-described four-membered ring and in addition a third silicon atom bridged between the two said phosphorus atoms, said third silicon atom being otherwise separately and singly bonded to two hydrocarbyl radicals, alike or different. Generic formulae for the monocyclic and bicyclic compounds may be written as follows (the R's, alike or different, are as defined above):

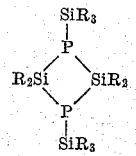

II. 1,3-di(perhydrocarbylsilyl)-2,4-perhydrocarbyl-1,3-diphospha-2,4-disilacyclobutane or P,P'-bis(trihydrocarbylsilyl)-P,P'-dihydrocarbylsilylenediphosphine and

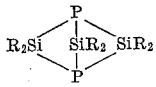

III. 2,4,5-perhydrocarbyl-1,3-diphospha-2,4,5-trisilabicyclo[1.1.1]pentane or

P,P'-tris(dihydrocarbylsilylene)-diphosphine

The nature of the various products is controlled by the choice of reactants as will be apparent from the following further explanation.

Due to the radically novel nature of these new products, there are no clearly defined or established precedents for proper nomenclature thereof. The compounds are regarded fundamentally as phosphine derivatives and have accordingly been so named. In the generic sense, i.e., as inclusive of both the acyclic and cyclic products, the compounds have been named as "silaphosphines," with the prefix "sila" being used to indicate combined silicon. However, following the precedents for proper radical nomenclature in organosilicon compounds [Chem. and Eng. News 30, 4517 (1952)], the specific acyclic compounds have been named as "silylphosphines." The cyclic products, while still generically "silaphosphines," have been named as silaphospha derivatives of the corresponding cyclic hydrocarbon simply because no clear-cut method permits naming these products as silylene cyclic diphosphines, although such names could be used and will be illustrated. The radical terminology "perhydrocarbyl" has been used in the generic and sometimes the specific naming of these compounds in the accepted meaning of the prefix "per" (C.A. 39, 5954 (1945)) in the sense of exclusive substitution, i.e., with hydrocarbyl radicals. The generic term "perhydrocarbylsilaphosphines" therefore has the meaning, based on recognized authorities, of phosphorus compounds containing combined silicon atoms, any residual valences of phosphorus and silicon not involved in linkage to each other being satisfied by the requisite number of hydrocarbyl radicals. Since the products are further limited to those wherein phosphorus is linked only to silicon and then only through single bonds for each Si-P linkage, it is believed the nomenclature is clear as to intent and scope, and is based on accepted usage. Note the generic formulae above.

In its process aspects, the invention is generic to a method for the preparation of the above-mentioned products which comprises the direct metathesis between an alkali metal or alkaline earth metal phosphide as below and a perhydrocarbylhalosilane carrying from one to three halogen atoms of atomic number from 17 to 53, and preferably from 17 to 35, in which any remaining valences of the silicon atom are satisfied by direct, single, and separate linkage to hydrocarbyl groups, alike or different. The hydrocarbylhalosilanes can thus be represented by the following structural formula:

wherein X is used to represent a halogen, preferably of atomic number 17 to 35, and most particularly chlorine; the R's are used to represent hydrocarbyl groups, alike or different and preferably of one to eight carbons each; and $n$ is an integer from one to three. The hydrocarbyl groups are generically inclusive of: alkyl (methyl, isopropyl, butyl, hexyl, octyl, 3-methylpentyl); aryl (phenyl, napthyl); cycloalkyl (cyclohexyl); alkaryl (tolyl, diethylphenyl); and aralkyl (benzyl, β-phenylethyl) groups or radicals of the requisite number of carbons. The hydrocarbyl groups and the halogens can be alike or different, but for reasons of readier availability those wherein all the hydrocarbyl groups and the halogens in any one halosilane are the same are preferred.

The complementary phosphorus reactants required with the just-described perhydrocarbylhalosilane reactants generically are the alkali metal and alkaline earth metal phosphides and per(hydrocarbyl)silylphosphides. By this terminology it is intended to include the persubstituted phosphides wherein the substituents are the alkali metal and alkaline earth metals and the perhydrocarbylsilyl radicals. Thus, the phosphorus atom in the trivalent phosphide must be bonded to at least one alkali metal or alkaline earth metal and otherwise bonded solely to perhydrocarbylsilyl radicals. These persubstituted phosphide reactants can be represented by the following structural formula:

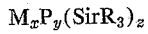

wherein M is used to represent the alkali metal and alkaline earth metals; the R's are hydrocarbyl groups as before; $x$ is an integer from one to three; $y$ is an integer from one to two; and $z$ is a cardinal number no greater than four, i.e., from zero to four. These three number variables are interrelated by the requirement that the product of $x$ times the formal valence of M plus $z$ must equal three times the value of $y$, i.e., $x$ (valence of M)$+z=3y$.

It is obvious that the hydrocarbyl radicals of the products will be those of the reactants. Preferably all hydrocarbyl radicals of the products are the same but they can be different. Consequently mixtures of reactants with different hydrocarbyl substituents are usable.

The reaction can be carried out at temperatures varying from −50° to +300° C. or higher, depending on the specific reactants and the products involved, as well as the other operating conditions. Generally speaking, the higher temperatures will be used in reaction systems where no solvent medium is involved and under such conditions elevated pressures will normally be used. However, since the reaction involved is one of a solid with a liquid and/or a solid and the products are liquids and/or solids, the effects of pressure are relatively minor. Under most operating conditions the preferred temperature range will be from 0° to about 100° or thereabouts, most preferably in the presence of an inert reaction medium liquid at the temperatures involved.

The reaction vessels used must be capable of withstanding the pressure generated in those instances where the reaction is carried out in a sealed vessel at elevated temperature. The reaction vessels must also be fabricated of materials unreactive with the reactants and products at the temperatures employed. Such materials are well known in the chemical processing art, including metallic platinum and platinum-lined vessels, and the cheaper and more common equipment fabricated from or lined with a commercially available alloy of nickel, iron, and molybdenum known to the trade as "Hastelloy C." Glass reaction equipment or glass-lined metal reactors are likewise usable and, for obvious reasons of cost, are preferred.

The reaction should be carried out under anhydrous, oxygen-free conditions, and, similarly, the reaction medium if used should be oxygen-free and anhydrous. Any inert liquid organic diluent can be used as a reaction medium. Generally speaking the most common media are the normally liquid hydrocarbons, the normally liquid hydrocarbon ethers and the normally liquid hydrocarbon tertiary amines, including the aliphatic and aromatic compounds, such as the hexanes, heptanes, octanes, and the like; benzene, toluene, the xylenes, and the like; cycloaliphatic hydrocarbon solvents, such as cyclohexane and the like; the hydrocarbon ethers, e.g., dibutyl ether, dipropyl ether, tetrahydrofuran, dioxane, 1,2-dimethoxyethane; the hydrocarbon tertiary amines, e.g., dimethylaniline, triethylamine, N-methylpiperidine; and the like. The choice of the particular diluent is not at all critical and will vary with such other normal variables as the reaction temperature found necessary.

The reaction mixture resulting from the metathetical reaction between the phosphide and the hydrocarbylhalosilane is worked up very simply. Generally the reaction mixture is first filtered to remove any alkali metal or alkaline earth metal halide formed as well as any unreacted phosphide, although this step is not essential. The reaction medium, if used, is removed by distillation and simple and conventional fractionation equipment is all that is needed, provided care is taken to carry out all steps under anhydrous, oxygen-free conditions. The simple perhydrocarbylsilaphosphines are generally liquids and are obtained from the reaction mixture by direct distillation. Generally only one precision fractionation is required to obtain the desired perhydrocarbylsilaphosphines in the necessary degrees of purity. The polycyclic perhydrocarbylsilaphosphines generally are higher boiling products and range from viscous liquids to viscous, semi-crystalline solids. In those instances where such products are formed, the reaction mixture will be filtered to remove any alkali metal or alkaline earth metal halide formed as well as any unreacted phosphide, the reaction medium will be removed by fractionation, and the higher molecular weight perhydrocarbylsilaphosphines will be obtained as the residue. In such instances care should be taken to thoroughly extract the solids to make sure all of the desired perhydrocarbylsilaphosphine is obtained.

While in the foregoing it has been stated that the perhydrocarbylsilaphosphines of the present invention are prepared from the completely substituted phosphides, it is within the broad purview of this invention to prepare the perhydrocarbylsilaphosphines by a multistage route involving, instead of the persubstituted phosphides, mono- or di-substituted phosphides wherein the phosphorus atom carries, respectively, two hydrogens or one hydrogen. Metathesis of these hydrogen-bearing phosphides with the requisite perhydrocarbylhalosilanes leads to the intermediate production of the corresponding perhydrocarbylsilyl phosphines carrying, respectively, two hydrogens or one hydrogen on phosphorus. These intermediate products can then be converted to the desired perhydrocarbylsilaphosphines of the present invention, wherein phosphorus is linked only to silicon, by intermediate formation of the alkali metal or alkaline earth metal salt of the hydrogen-bearing perhydrocarbylsilaphosphine and subsequent reaction with the desired perhydrocarbylhalosilane, all as illustrated in further detail in Example 4, infra.

While this procedure results in the formation of the same desirable perhydrocarbylsilaphosphines, it is obviously less desirable in that a multistage route is involved. Furthermore, the intermediate perhydrocarbylsilaphosphines wherein hydrogen is linked to phosphorus are extremely unstable compounds, and accordingly processing conditions are quite critical. In the overall picture the final yields of the desired perhydrocarbylsilaphosphines are consequently greatly reduced. Accordingly, it is preferred that the perhydrocarbylsilaphosphines be prepared directly from the completely substituted phosphides.

The following examples in which parts are given by weight further illustrate the invention but are not to be taken as limitative thereof. Unless otherwise noted, pressure in these examples is ambient atmospheric, i.e., about 760 mm. of mercury.

EXAMPLE I $Li_3P + 3(C_2H_5)_2SiCl_2 \rightarrow$ 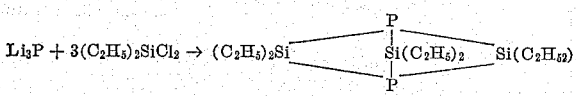

A solution of phenyllithium was prepared from 3.5 parts of lithium and 40 parts of bromobenzene in about 105 parts of anhydrous diethyl ether according to the method given in "Organic Syntheses," page 517, Collective Vol. II, Blatt, John Wiley, 1943. The resultant phenyllithium solution was filtered and slowly added with stirring under anhydrous, oxygen-free conditions to about 70 parts of anhydrous diethyl ether saturated with phosphine. Trilithium phosphide (commonly but less precisely, referred to as lithium phosphide) separated from solution during the addition as a cream-colored powder.

The trilithium phosphide suspension of the preceding paragraph was cooled to 0° C. and a solution of 15.7 parts of diethyldichlorosilane in about 17 parts of anhydrous diethyl ether was added dropwise with stirring under anhydrous, oxygen-free conditions. The reaction mixture was then allowed to warm to room temperature, filtered, and distilled through a fractionation column packed with glass helices, all under nitrogen. There was thus obtained 2.9 parts of crude 2,2,4,4,5,5-hexaethyl-1,3-diphospha-2,4,5-trisilabicyclo[1.1.1]pentane as a colored, viscous liquid boiling over the range 85–125° C. under a pressure corresponding to 0.3 mm. of mercury. The crude product was redistilled under an atmosphere of nitrogen through a spinning band distillation column (U.S. Patent 2,712,520). There was thus obtained 1.0 part of pure 2,2,4,4,5,5-hexaethyl-1,3-diphospha-2,4,5-trisilabicyclo[1.1.1]pentane as a light yellow, viscous liquid boiling at 145–155° C. under a pressure corresponding to 0.6 mm. of mercury; $n_D^{25}$, 1.5900.

Analysis.—Calcd. for $C_{12}H_{30}P_2Si_3$: C, 45.0%; H, 9.4%; P, 19.3%. Found: C, 45.3%, 45.3%; H, 9.5%, 9.4%; P, 20.1%, 20.5%.

Examination of the nuclear magnetic resonance spectrum of the purified product showed it to be consistent with the diphosphatrisilabicyclopentane structure.

EXAMPLE 2

$Li_3P + 3(CH_3)_3SiCl \rightarrow [(CH_3)_3Si]_3P$

A phenyllithium solution was prepared as in Example 1 from 7.0 parts of lithium, 80.0 parts of bromobenzene, and about 245 parts of anhydrous diethyl ether. This solution was slowly added with stirring to about 350 parts of anhydrous diethyl ether saturated with phosphine as in Example 1. The suspension of trilithium phosphide was cooled to 0° C. and 42.5 parts of trimethylchlorosilane was added dropwise with stirring under anhydrous, oxygen-free conditions. The resultant reaction mixture was allowed to warm to room temperature, and the diethyl ether solvent removed therefrom by distillation. The residue was filtered under nitrogen and the filtrate separated by fractionation through a spinning band distillation column under anhydrous, oxygen-free conditions. There was thus obtained 12.2 parts (37% of theory) of tris(trimethylsilyl)phosphine as a clear, colorless liquid boiling at 49–55° C. under a pressure corresponding to 1 mm. of mercury; $n_D^{25} = 1.5068$.

Analysis.—Calcd. for $C_9H_{27}PSi_3$: C, 43.2%; H, 10.9%; P, 12.4%. Found: C, 44.9%, 44.4%; H, 10.9%, 10.8%; P, 11.9%, 11.9%.

Examination of the nuclear magnetic resonance spectrum of the purified product showed it to be consistent with the tris(trisilyl)phosphine structure. Cryoscopic determination of molecular weight showed the product to have a molecular weight of 246, 230, versus a theoretical value of 250.

EXAMPLE 3

$2Na_3P + 3(C_2H_5)_2SiCl_2 \rightarrow$ 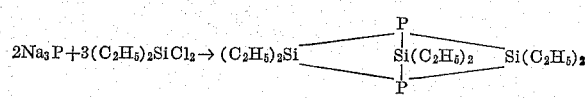

A thick-walled cylindrical glass reactor, roughly 24 diameters long and of total internal capacity corresponding to 130 parts of water, was charged with 5.2 parts of commercial trisodium phosphide and 12.25 parts of diethyldichlorosilane. A second similar glass reactor was charged with 4.6 parts of commercial trisodium phosphide and 10.8 parts of diethyldichlorosilane. The tubular reactors were evacuated, sealed, and heated under autogenous pressure at 200° C. for eight hours, then at 250° C. for eight hours, and finally at 300° C. for eight hours. The reactors were then cooled to liquid nitrogen temperature and opened. The opened reactors were then evacuated to a pressure corresponding to 0.01 mm. of mercury and slowly allowed to warm to room temperature under these conditions. The reactors were transferred to a nitrogen atmosphere, and the contents thereof rinsed out with about seven parts of anhydrous diethyl ether for each reactor. The rinsings were combined and filtered under nitrogen, and the filtrate was fractionated through a precision distillation column. There was thus obtained 0.2 part of pure 2,2,4,4,5,5 - hexaethyl - 1,3 - diphospha - 2,4,5 - trisilabicyclo[1.1.1]pentane as a light yellow, viscous liquid boiling at 140–148° C. under a pressure corresponding to 0.1 mm. of mercury.

EXAMPLE 4

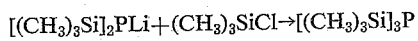

A butyllithium solution was prepared under anhydrous, oxygen-free conditions in the manner used in Example 1 for a phenyllithium solution from 0.5 part of lithium, 4.1 parts of n-butyl bromide, and about 20 parts of anhydrous diethyl ether. The solution was cooled to 0° C. and thereto was added dropwise with stirring 4.8 parts of bis(trimethylsilyl)phosphine [prepared in 35% yield in the general manner given in Example 1 for the tris compound, varying in that dilithium phosphide was used; B.P. 170–172° C. at atmospheric pressure]. The reaction mixture containing the lithium bis(trimethylsilyl)phosphide was allowed to warm to room temperature and 2.9 parts of trimethylchlorosilane was then added dropwise with stirring. The reaction mixture was stirred at room temperature for one hour, and the white solid which had formed on the addition of the trimethylchlorosilane was removed by filtration under nitrogen. The filtrate was fractionated under anhydrous, oxygen-free conditions through a spinning band column. There was thus obtained 3.2 parts (48% of theory) of tris(trimethylsilyl)phosphine boiling at 237–240° C. at atmospheric pressure; $n_D^{25}=1.5007$.

In addition to the perhydrocarbylhalosilane reactants and the metal phosphide reactants illustrated in the foregoing detailed examples, there can also be used in the process of the present invention other such reactants to form still other perhydrocarbylsilaphosphines of the present invention. Thus, the following are additional examples of the products and process of the invention: from trimethylchlorosilane and trisodium phosphide there is obtained tris(trimethylsilyl)phosphine; from tribenzylbromosilane and trisodium phosphide there is obtained tris(tribenzylsilyl)phosphine; from tri-n-octylchlorosilane and trilithium phosphide there is obtained tris(tri-n-octylsilyl)phosphine; from ethylmethyl dibromosilane and tricalcium diphosphide there is obtained 2,4,5-triethyl-2,4,5-trimethyl-1,3-diphospha - 2,4,5 - trisilabicyclo[1.1.1]pentane; from di-n-octyl-dichlorosilane and trisodium phosphide there is obtained 2,2,4,4,5,5-hexa-n-octyl - 1,3 - diphospha - 2,4,5 - trisilabicyclo[1.1.1]pentane; from diphenylbromochlorosilane and tripotassium phosphide there is obtained 2,2,4,4,5,5-hexaphenyl-1,3-diphospha-2,4,5-trisilabicyclo[1.1.1]pentane; from di-p-tolyldichlorosilane and trilithium phosphide there is obtained 2,2,4,4,5,5-hexa-p-tolyl-1,3-diphospha - 2,4,5-trisilabicyclo[1.1.1]pentane; from cyclohexylmethyldichlorosilane and trimagnesium diphosphide there is obtained 2,4,5-tricyclohexyl-2,4,5-trimethyl-1,3-diphospha-2,4,5-trisilabicyclo[1.1.1]pentane; from lithium bis(trimethylsilyl)phosphide and dimethyldichlorosilane there is obtained P,P,P′,P′-tetrakis(trimethylsilyl)dimethylsilylenediphosphine; from lithium bis(triethylsilyl)phosphide and di-n-octyldichlorosilane there is obtained P,P,P′,P′ - tetrakis(triethylsilyl)di-n-octylsilylenediphosphine; from dilithium trimethylsilylphosphide and dimethyldichlorosilane there is obtained 2,2,4,4-tetramethyl - 1,3 - bis(trimethylsilyl) - 1,3 - diphospha-2,4-disilacyclobutane; from lithium bis(trimethylsilyl)phosphide and methyltrichlorosilane there is obtained P,P,P′,P′,P″,P″ - hexakis(trimethylsilyl)methylsilylidynetriphosphine; from lithium bis(triethylsilyl)phosphide and trimethylchlorosilane there is obtained bis(triethylsilyl)-trimethylsilylphosphine; from dilithium trimethylsilylphosphide and trimethylchlorosilane there is obtained tris(trimethylsilyl)phosphine; and the like.

The new perhydrocarbylsilaphosphines of this invention generally range from colorless, high boiling liquids through viscous high boiling oils to solid semicrystalline materials depending on molecular weight and complexity of substituents. The lowest boiling product and the simplest, i.e., tris(trimethylsilyl)phosphine, boils at approximately 240° C. at atmospheric pressure. These perhydrocarbylsilaphosphines are soluble in inert liquid diluents, such as the normally liquid hydrocarbons, and halohydrocarbons including the polyfluorocarbons.

Depending upon boiling point and molecular weight, these products exhibit varying degrees of flammability. The lower molecular weight products are spontaneously inflammable in air; the higher molecular weight, especially cyclic, products in both forms are not spontaneously inflammable in bulk. However, when under conditions such that the surface to weight ratio is high, e.g., when absorbed onto or into fabric or paper, the so-treated objects are spontaneously flammable, even with the cyclic products. Because of these tendencies, these new products should always be handled under an inert atmosphere, such as nitrogen, argon, helium, carbon dioxide, and the like. In any event, the new perhydrocarbylsilaphosphines should be handled under oxygen-free conditions and preferably also under anhydrous conditions since they are hydrolytically sensitive.

The degree of spontaneous inflammability permits use of these perhydrocarbylsilaphosphines in a wide range of outlets where controlled flammability is desired. Thus, these new perhydrocarbylsilaphosphines, particularly the lower molecular weight liquid products, find generic utility as ignition agents in that they permit controlled ignition of combustible materials, such as fuels, by incorporation therein and subsequent exposure to the atmosphere whenever ignition is desired.

Conversely, these new perhydrocarbylsilaphosphines, particularly the cyclic products, exhibit generic utility as gasoline stabilizers, especially for the conventional leaded gasolines. They serve as oxygen scavengers and prevent the deterioration of the fuel on storage. Such utility is illustrated in Example A.

EXAMPLE A

Each of two glass flasks of 100 ml. capacity was charged with 50 ml. of a commercial leaded automotive gasoline comprising about 10 volume percent motor alkylate and about 90 volume percent catalytically cracked hydrocarbons and containing the commercial automotive fuel limit standard of 3 ml. of tetraethyllead per gallon. The charged flasks were then connected to a 760 mm. open end mercury manometer. The flasks were let stand for one hour at room temperature to equilibrate and the internal pressure then vented to atmospheric pressure. Tris(trimethylsilyl)phosphine, suitably illustrative of the perhydrocarbylsilaphosphines of this invention (see Example 2), in the amount of 0.5 ml. was added to the gasoline in one flask.

Both flasks were resealed at atmospheric pressure and each connected to the manometers and allowed to stand at room temperature for a period of 166 hours. Readings were taken of the pressure in each flask. The pressure in the control flask had decreased markedly at the time of the first reading at 65 hours and continued to decrease until the last reading. The pressure in the flask containing the tris(trimethylsilyl)phosphine-treated fuel remained constant over the entire period at 760 mm. Thus, the silaphosphine served as an efficient and notably effective stabilizer for the gasoline sample.

The following table presents the detailed observation data:

Table

| Time elapsed, hr. | Pressure | |
|---|---|---|
| | Control, mm. | Treated Sample, mm. |
| 0 | 760 | 760 |
| 65 | 745 | 760 |
| 89 | 740 | 760 |
| 96 | 729 | 760 |
| 112 | [1] 711 | 760 |
| 120 | 715 | 760 |
| 144 | 715 | 760 |
| 166 | 710 | 760 |

[1] Temp. effect.

When compounded into the conventional commercial rubbers, e.g., the elastomers, by conventional procedures such as milling and calendering, these products likewise serve as oxygen stabilizers and prevent deterioration of the rubber, e.g., stiffening, on aging in the atmosphere.

Since obvious modifications in the invention will be evident to those skilled in the art, I propose to be bound solely by the appended claims.

The embodiments of the invention in which an exclusive property or privilege is claimed are defined as follows:

1. A perhydrocarbylsilaphosphine of from one to two phosphorus atoms, free from aliphatic unsaturation, and containing trivalent phosphorus bonded solely to silicon, the silicon in turn bonded solely to phosphorus and hydrocarbyl groups, all said phosphorus and silicon atoms carrying only single bonds.

2. A tris(trihydrocarbylsilyl)phosphine free from aliphatic unsaturation.

3. Tris(trimethylsilyl)phosphine.

4. A 2,2,4,4,5,5-hexakis(hydrocarbyl)1,3-diphospha-2,4,5-trisilabicyclo[1.1.1]pentane free from aliphatic unsaturation.

5. 2,2,4,4,5,5 - hexaethyl - 1,3 - diphospha-2,4,5-trisilabicyclo[1.1.1]pentane.

6. The process which comprises reacting a per(hydrocarbyl)halosilane, free from aliphatic unsaturation and containing halogen of atomic number from 17 to 53, with a member of the group consisting of alkali and alkaline earth metal phosphides and the alkali and alkaline earth metal salts of perhydrocarbylsilylphosphines free from aliphatic unsaturation.

7. The process which comprises reacting an alkali metal phosphide with diethyldichlorosilane to produce 2,2,4,4,5,5 - hexaethyl - 1,3 - diphospha - 2,4,5 - trisilabicyclo[1.1.1]pentane.

8. The process which comprises reacting an alkali metal phosphide with trimethylchlorosilane to produce tris(trimethylsilyl)phosphine.

No references cited.

UNITED STATES PATENT OFFICE

CERTIFICATE OF CORRECTION

Patent No. 2,907,785                                          October 6, 1959

George W. Parshall

It is hereby certified that error appears in the printed specification of the above numbered patent requiring correction and that the said Letters Patent should read as corrected below.

Column 4, line 12, for the formula "$M_xP_y(SirR_3)_z$" read -- $M_xP_y(SiR_3)_z$ -- column 5, line 64, EXAMPLE I, extreme right-hand portion of the formula, for "$Si(C_2H_{52})$" read -- $Si(C_2H_5)_2$ --; column 8, line 9, for "generally" read -- generically --.

Signed and sealed this 26th day of April 1960.

(SEAL)
Attest:
KARL H. AXLINE                                        ROBERT C. WATSON
Attesting Officer                                    Commissioner of Patents